United States Patent Office 2,938,008
Patented May 24, 1960

2,938,008

BLEND OF ACRYLONITRILE POLYMER WITH POLYBETACYANOETHYL VINYL ETHER, SOLUTIONS THEREOF, SHAPED ARTICLE THEREFROM, AND METHOD OF MAKING SAME

Weston Andrew Hare, Wilmington, Del., assignor to E. I. du Pont de Nemours and Company, Wilmington, Del., a corporation of Delaware No Drawing. Filed July 29, 1957, Ser. No. 674,620

14 Claims. (Cl. 260—32.6)

This invention relates to polymer compositions comprising polyacrylonitrile and to articles obtained therefrom.

Polyacrylonitrile is of importance in the textile fiber field because of its good fiber-forming qualities and the desirable aesthetic and durability properties of the resulting fibers. Of particular value are fibers of acrylonitrile polymers containing at least 85% by weight of combined acrylonitrile. One deficiency in these fibers, particularly those from the homopolymer of acrylonitrile, is a tendency for splitting of the filaments which results in poor abrasion resistance as compared to certain other textile fibers and which also leads to fibrillation when yarns are passed over guides and other surfaces during textile processing. This fibrillation results in deposits on the textile equipment and in "fly" in the air around this equipment.

It is also important that the textile fibers be made to accept dyestuff. The usual solution to the dyeability problem is copolymerization of acrylonitrile with one or more additional monomers. Such modification generally results in impaired physical properties, particularly under hot, wet conditions. So, the alternative of mixing polymers for dyeability improvement has become of interest. Most mixtures have proven incompatible, both in solution and in final fiber so this approach has generally made the fibrillation and abrasion resistance problems more acute.

It is an object of this invention to provide acrylonitrile fibers of improved abrasion resistance and fibrillation characteristics. It is an object to provide fibers of satisfactory hot, wet properties. Still another object is to provide fibers of acceptable dyeability characteristics. Other objects will appear hereinafter.

The objects of the invention are accomplished by preparing fibers from a blend of an acrylonitrile polymer containing at least about 85% by weight combined acrylonitrile in the polymer, with a cyanoethylated polyvinyl alcohol; i.e., poly(beta-cyanoethyl vinyl ether), herein referred to as PVAAN. Such blends are conveniently prepared by mixing the acrylonitrile polymer with poly(beta-cyanoethyl vinyl ether) when preparing a spinning solution. Surprisingly, these polymer blends are compatible in solution and this compatibility is retained in fibers produced by extruding these solutions. Poly(beta-cyanoethyl vinyl ether), may be prepared by the method of Houtz, U.S. 2,341,553, starting with polyvinyl alcohols containing no more than about 20% unhydrolyzed acetate groups.

The following examples illustrate specific embodiments of the invention. All parts, percentages and proportions are by weight unless otherwise specified.

EXAMPLE I

A mixture of 40 grams of low viscosity polyvinyl alcohol having a molecular weight of about 10,000, 232 grams of acrylonitrile and 9 grams of 9% aqueous sodium cyanide is heated to reflux in a 500-cc. flask equipped with reflux condenser and stirrer. After 2 hours of refluxing, the solution is filtered through a sintered glass filter and the clear filtrate is further refluxed for 10 minutes to assure complete reaction of the polyvinyl alcohol with acrylonitrile. The solution is poured into ethyl ether to precipitate the polymer. After standing overnight, the gummy polymer is washed with water by kneading, then dissolved in acetone and reprecipitated by pouring into water. The solid poly(beta-cyanoethyl vinyl ether) product is filtered off and dried over phosphorus pentoxide in a vacuum desiccator.

PVAAN polymers are also prepared from medium viscosity polyvinyl alcohol having a molecular weight of about 25,000 and high viscosity polyvinyl alcohol having a molecular weight of about 35,000 by an identical procedure. These products will be referred to hereinafter as low viscosity PVAAN, medium viscosity PVAAN, and high viscosity PVAAN respectively.

A spinning solution is prepared by adding 0.25 pounds of low viscosity PVAAN and 2.25 pounds of a copolymer of 94% acrylonitrile and 6% methyl acrylate to 7.5 pounds of dimethylformamide (DMF) at 60° C. with stirring. The resulting solution is perfectly clear in appearance, shows none of the graininess which is usually found when two incompatible polymers are mixed together in a solvent to form a solution. A film cast from this solution is perfectly clear, again indicating compatibility of the two polymers.

The remainder of the solution is dry spun through a 40-hole spinneret. An aqueous finish is applied at the bottom of the spinning cell and the yarn is wound onto a perforated pirn-type package. DMF solvent is removed from the yarn while on the package by pressure extraction with room temperature water. The washed yarn is then drawn in steam under pressure, relaxed by passage over heated rolls, and again packaged. The draw ratio used is 8×, that is, each meter of undrawn yarn becomes 8 meters of yarn after drawing. This length is reduced to 7 meters by relaxation which is allowed to take place on the hot rolls. The final denier of the yarn is 100.

Following the above procedure, similar yarns are prepared from medium viscosity and high viscosity PVAAN. For comparison, a control yarn is produced from a spinning solution containing 2.5 pounds of the 94/6 acrylonitrile/methyl acrylate copolymer in 7.5 pounds of DMF with no additive.

Apparatus for measuring the abrasion resistance of yarns consisting of a reciprocating bar mounted 3 inches above a horizontal Al Si Mag pin, ⅛ inch in diameter. One end of the yarn strand is attached to the reciprocating bar and the strand is then caused to pass 360° around the pin, thence 180° around the portion of itself leading from the reciprocating bar to the pin and thence 90° around the pin in the direction whence it came, the free end hanging vertically and being attached to a 30-gram weight. The reciprocating motion of the bar causes the yarn to rub on the Al Si Mag pin and on itself. This motion is continued for a sufficient number of cycles to cut the yarn completely in two.

Using this apparatus, the four yarn samples were measured for abrasion resistance, a sufficient number of strands on each sample being used to give reliable results. The data in Table I show the abrasion resistance in number of cycles required to break the yarn.

Table I
ABRASION RESISTANCE

| Yarn With No Additive | Yarn With Low Viscosity PVAAN | Yarn With Medium Viscosity PVAAN | Yarn With High Viscosity PVAAN |
|---|---|---|---|
| 333 | 514 | 515 | 540 |

EXAMPLE II

The spun and extracted yarns from Example I containing low viscosity PVAAN and medium viscosity PVAAN and the control yarn with no additive are drawn in pressure steam to a 6× draw ratio and shrunk 12% in length by relaxing on heated rolls. These yarns are measured for abrasion resistance as in the previous example, the following results being obtained.

Table II
ABRASION RESISTANCE

| Yarn With No Additive | Yarn Containing Low Viscosity PVAAN | Yarn Containing Medium Viscosity PVAAN |
|---|---|---|
| 711 | 817 | 935 |

EXAMPLE III

The yarn from Example I which contained low viscosity PVAAN is measured for fibrillation by running it under 80 grams tension over a rotating polished chromium-plated spindle. In this test, the yarn traveling at 100 yards per minute makes one complete spiral turn around the spindle which is rotating in a direction opposite to that of the yarn with a surface speed of 100 yards per minute. At 10 minute intervals, the fibrillar mass which collects on the spindle is removed, treated with chloroform to extract finishing materials, and dried. From the dry weight of this material and the running time and take-up speed, the amount of fibrillation as grams per million yards of yarn is calculated.

According to this test, the fiber containing low viscosity PVAAN produces only 0.9 gram of fibrils per million yards, whereas the control fiber containing no PVAAN additive produces 11.5 grams of fibrils per million yards.

EXAMPLE IV

A blend of pulverized polymers consisting of 2.375 pounds of acrylonitrile homopolymer and 0.125 pound of medium viscosity PVAAN is slowly added with stirring to 7.5 pounds of dimethylformamide which has been cooled to 25° C. After the resulting slurry is thoroughly blended, it is heated to 70° C. to effect complete solution of the polymers. The resulting clear solution shows no evidence of polymer incompatibility. It is dry spun into 40-filament yarn and finish is applied prior to windup. The spun yarn so obtained is extracted while on the package with water at 20° C. to remove spinning solvent and is then drawn 8× in steam under pressure. After shrinking 10% in length by relaxing on heated rolls, the yarn is collected on a package. Its denier is 99.5. A sample of acrylonitrile homopolymer yarn containing no additive is prepared in a similar manner.

When the two yarns are dyed simultaneously with a dispersed type dye (prototype No. PR 62) sold under the trademark "Celanthrene" Blue, the yarn containing the PVAAN becomes considerably deeper in color, showing that the additive improved the dyeing characteristics of the fiber. Similar results are obtained when Brilliant Green Crystals (Color Index 662), a basic dye is used.

The initial modulus of the control fiber, measured at 90° C. while immersed in water, is 6.0 grams per denier. That of the fiber containing 5% medium viscosity PVAAN is 4.7 grams per denier, considerably closer to that of the control yarn than would be obtained for typical acrylonitrile copolymers containing 5% of other vinyl monomer.

The abrasion resistance and fibrillation properties of the two fibers are given in Table III.

Table III

| Property | Control Fiber | Fiber Containing 5% Medium Viscosity PVAAN |
|---|---|---|
| Abrasion resistance, (cycles) | 195 | 790 |
| Fibrillation (gm./million yds.) | 18 | 3 |

As indicated in the examples, the viscosity of the polyvinyl alcohol used to prepare the poly(beta-cyanoethyl vinyl ether) is not critical for operability. Polyvinyl alcohols of molecular weight between 10,000 and about 35,000 are quite satisfactory. Unhydrolyzed acetate groups remaining on the polyvinyl alcohol may amount to as much as 20 percent. Those products in which 80 to 100% of the original hydroxyl groups from the polyvinyl alcohol are combined with acrylonitrile are preferred in the invention.

Polyacrylonitrile (the homopolymer) and the acrylonitrile copolymers containing 5 to 10% methyl acrylate are particularly desirable in this invention. However, the comonomer may also come from the group consisting of vinyl acetate, methyl vinyl ketone, methyl methacrylate, dimethyl itaconate, butyl methacrylate, methacrylonitrile, styrene, acrylic acid, vinyl pyridine, vinyl imidazole or any other monomer given in Jacobson U.S. 2,436,926. Likewise, a terpolymer containing 2 of these comonomers in addition to acrylonitrile may be used. The combined acrylonitrile content of the polymer should always be at least about 85% by weight.

In accordance with this invention, acrylonitrile polymers may be combined with from about 2 to about 25% by weight of the poly(beta-cyanoethyl vinyl ether), and preferably between about 5 and about 10% by weight, based on the weight of composition.

As spinning solvent, dimethylformamide is preferred for reasons of ease of handling, low boiling point, for example. However, any of the organic solvents normally used for polyacrylonitrile spinning, e.g., dimethylacetamide, gamma-butyrolacetone, tetramethylene cyclic sulfone, ethylene cyclic carbonate and dimethyl sulfoxide, may be used. The preparation of the spinning solution may be made by adding the polymers one at a time to the solvent or by dry blending the polymers and adding the blend. When DMF is used, the solution may be made by cooling to a temperature at which it will not dissolve the acrylonitrile polymer and then preparing a homogeneous slurry which can be heated to effect solution. Alternatively DMF may be heated to about 60 to 80° C. and the polymers added at that temperature so that solution takes place more or less immediately.

The solutions may be used for film casting, in which case clear films will result, or may be spun into filaments by either dry spinning or wet spinning processes. These filaments may be drawn either in steam or under the influence of dry heat in order to produce filaments having improved textile properties. These properties may be improved still more by allowing the fibers to shrink about 10 to 15% in length, again under the influence of heat.

The products of this invention are useful as fibers for the preparation of wearing apparel of both woven and knit construction. They are likewise useful for the preparation of industrial-type fabrics, for example filter cloths, where resistance to abrasion is an important property.

An important advantage of the invention lies in the improved abrasion resistance and fibrillation resistance of the products. The amount of fibrillation during passage over a guide surface coming from a fiber produced in accordance with this invention is less than 1/10 the amount resulting from fibers prepared by normal procedures; i.e., from spinning solutions which do not contain poly(beta-cyanoethyl vinyl ether). The abrasion resistance of fibers is increased by at least about 50%. Dyeability of the fibers with both dispersed and basic dyes is also enhanced.

I claim:

1. Composition of matter comprising a polymer selected from the group consisting of (1) polyacrylonitrile and (2) a copolymer of at least about 85% by weight of acrylonitrile with at least one copolymerizable monomer containing at least one ethylenically unsaturated group and from about 2% to about 25% by weight poly(beta-cyanoethyl vinyl ether), based on the total polymer weight.

2. Composition of claim 1 wherein the copolymer of acrylonitrile contains between about 5% and about 10% by weight methyl acrylate combined in the polymer.

3. Composition of claim 1 containing between about 5% and about 10% by weight poly(beta-cyanoethyl vinyl ether), based on the total polymer weight.

4. Shaped article comprising a polymer selected from the group consisting of (1) polyacrylonitrile and (2) a copolymer of at least about 85% by weight of acrylonitrile with at least one copolymerizable monomer containing at least one ethylenically unsaturated group and from about 2% to about 25% by weight poly(beta-cyanoethyl vinyl ether), based on the total polymer weight.

5. A fiber comprising a polymer selected from the group consisting of (1) polyacrylonitrile and (2) a copolymer of at least about 85% by weight of acrylonitrile with at least one copolymerizable monomer containing at least one ethylenically unsaturated group and from about 2% to about 25% by weight poly(beta-cyanoethyl vinyl ether), based on the total polymer weight.

6. The fiber of claim 5 drawn six to eight times its original length, having an abrasion resistance at least 50% greater than a fiber consisting of a polymer selected from the group consisting of (1) polyacrylonitrile and (2) a copolymer of at least about 85% by weight of acrylonitrile with at least one copolymerizable monomer containing at least one ethylenically unsaturated group, and which has been similarly drawn to about six to eight times its original length.

7. Novel composition of matter comprising a solution in an organic solvent for acrylonitrile polymers of a polymer selected from the group consisting of (1) polyacrylonitrile and (2) a copolymer of at least about 85% by weight of acrylonitrile with at least one copolymerizable monomer containing at least one ethylenically unsaturated group and from about 2% to about 25% by weight poly(beta-cyanoethyl vinyl ether), based on the total polymer weight.

8. Composition of claim 7 wherein said organic solvent is dimethylformamide.

9. Novel composition of matter comprising a solution in an organic solvent for polyacrylonitrile of from about 2% to about 25% by weight poly(beta-cyanoethyl vinyl ether), based on the total polymer weight, the remainder consisting essentially of polyacrylonitrile.

10. Novel composition of matter comprising a solution in an organic solvent for acrylonitrile polymers of a copolymer of between about 5% and about 10% by weight of methyl acrylate, the remaining polymeric constituent consisting essentially of acrylonitrile, and from about 2% to about 25% by weight poly(beta-cyanoethyl vinyl ether), based on the total polymer weight.

11. Novel composition of matter comprising a polymer selected from the group consisting of (1) polyacrylonitrile and (2) a copolymer of at least about 85% by weight of acrylonitrile with at least one copolymerizable monomer containing at least one ethylenically unsaturated group and from about 2% to about 25% by weight, based on the total polymer weight, of an 80% to 100% cyanoethylated polyvinyl alcohol.

12. Process comprising dissolving in an organic solvent for acrylonitrile polymers, poly(beta-cyanoethyl vinyl ether), and a polymer selected from the group consisting of (1) polyacrylonitrile and (2) a copolymer of at least about 85% by weight of acrylonitrile with at least one copolymerizable monomer containing at least one ethylenically unsaturated group, to produce a solution containing between about 2% and about 25% poly(beta-cyanoethyl vinyl ether), based on the total polymer weight.

13. Process comprising dissolving in an organic solvent for acrylonitrile polymers, an 80% to 100% cyanoethylated polyvinyl alcohol and a polymer selected from the group consisting of (1) polyacrylonitrile and (2) a copolymer of at least about 85% by weight of acrylonitrile with at least one copolymerizable monomer containing at least one ethylenically unsaturated group, to produce a solution containing between about 2% and about 25%, based on the total polymer weight, of the 80% to 100% cyanoethylated polyvinyl alcohol and forming the resulting solution into a shaped article.

14. Process comprising dissolving in an organic solvent for acrylonitrile polymers, an 80% to 100% cyanoethylated polyvinyl alcohol and a polymer selected from the group consisting of (1) polyacrylonitrile and (2) a copolymer of at least about 85% by weight of acrylonitrile with at least one copolymerizable monomer containing at least one ethylenically unsaturated group, to produce a solution containing between about 2% and about 25% poly(beta-cyanoethyl vinyl ether), based on the total polymer weight, forming the resulting solution into fibers, drawing the fibers from six to eight times their original length and relaxing said drawn fibers from 10% to 15%.

No references cited.